Oct. 25, 1960 S. F. ANDERSON 2,957,435
APPARATUS FOR FORMING FROZEN STICK CONFECTIONS
Filed Oct. 4, 1956 3 Sheets-Sheet 1
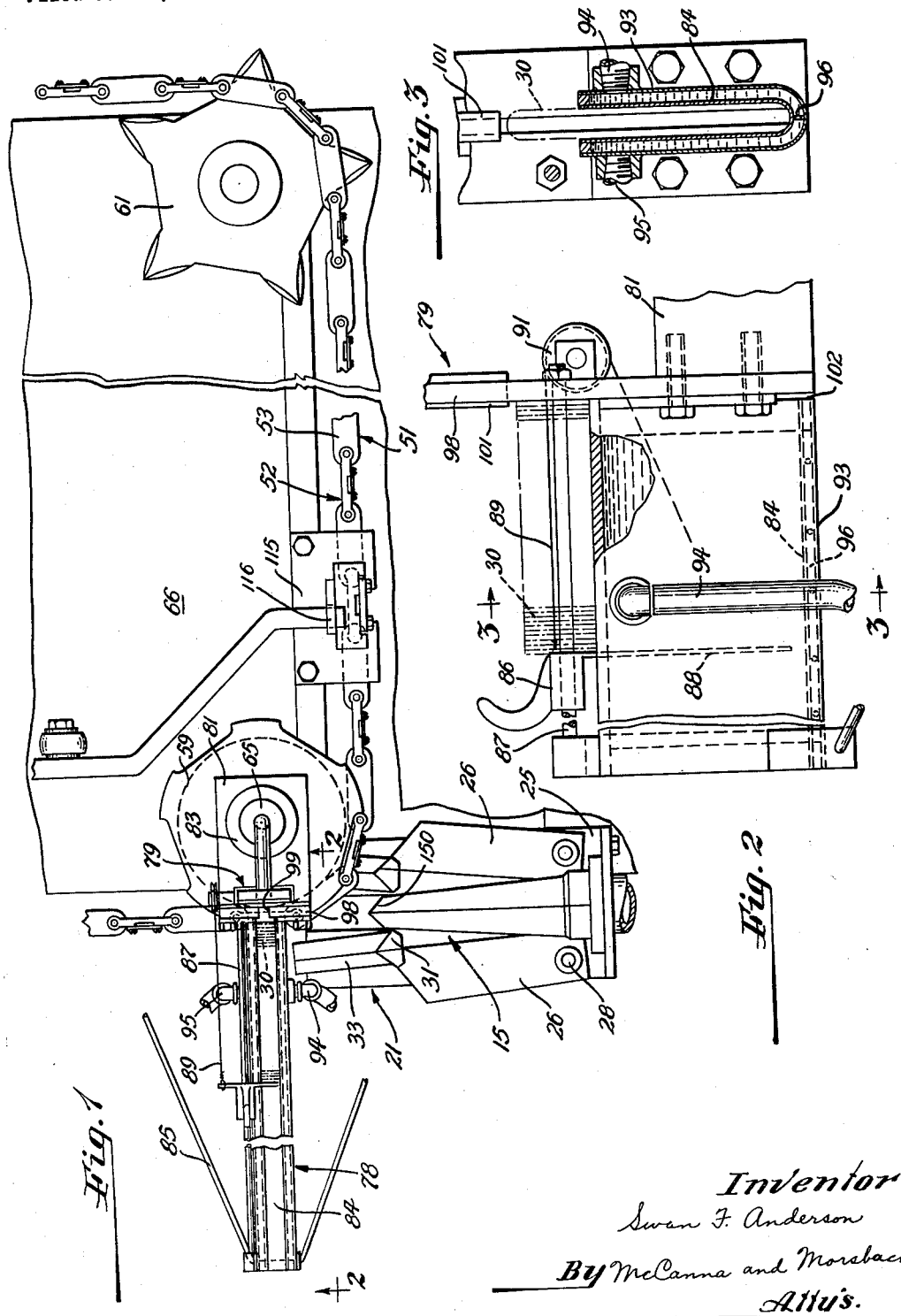
Inventor
Swan F. Anderson
By McCanna and Morsbach
Attys.

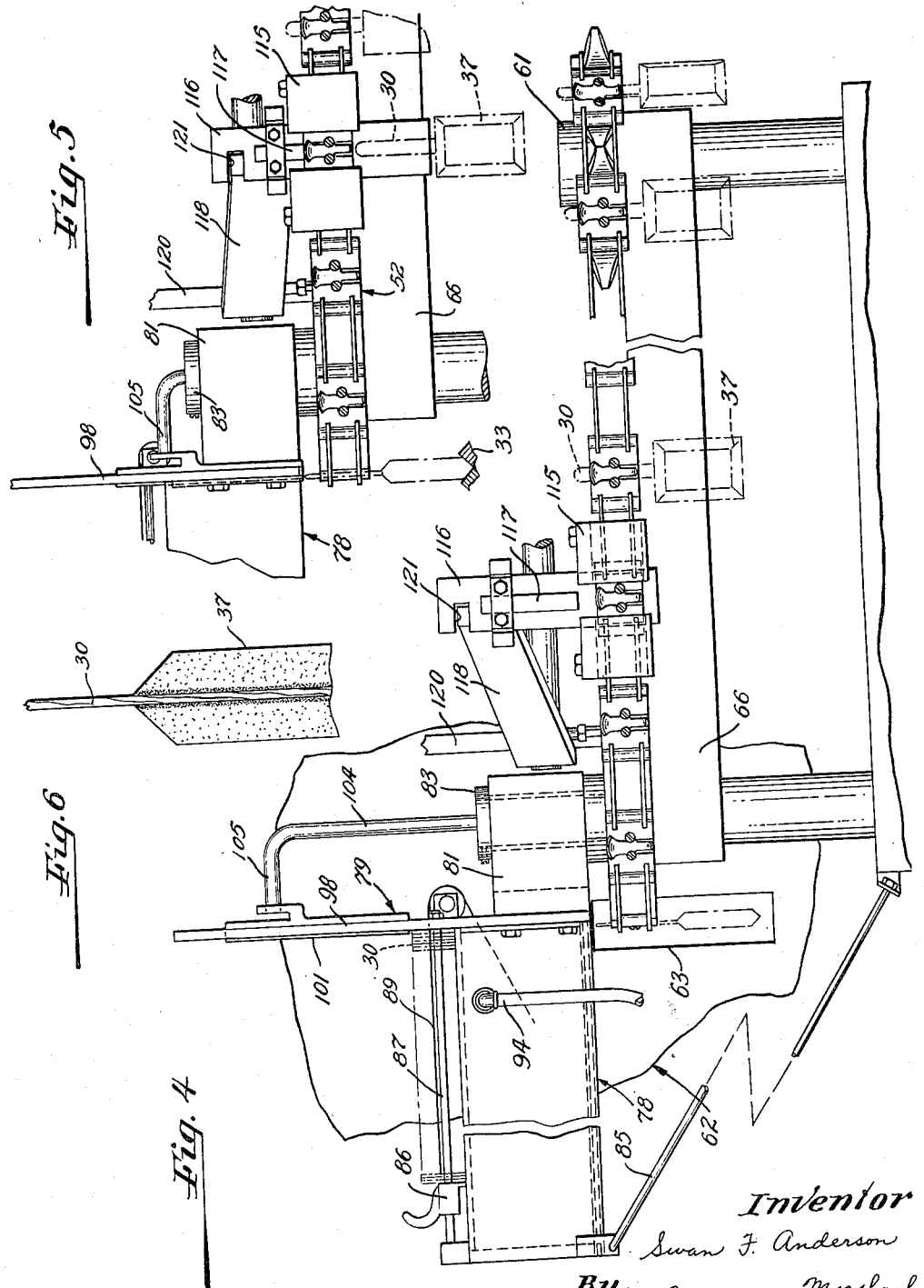

Oct. 25, 1960  S. F. ANDERSON  2,957,435
APPARATUS FOR FORMING FROZEN STICK CONFECTIONS
Filed Oct. 4, 1956  3 Sheets-Sheet 3
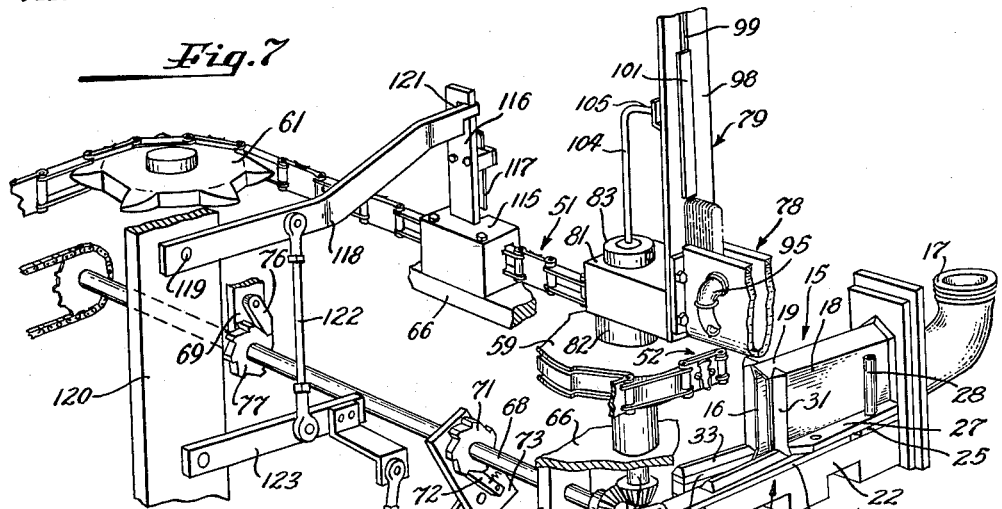
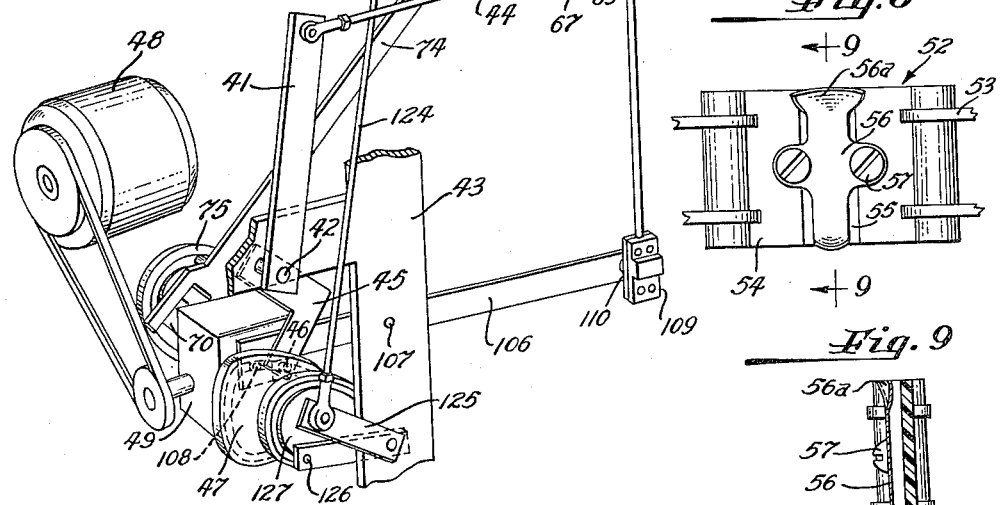
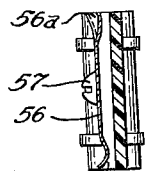
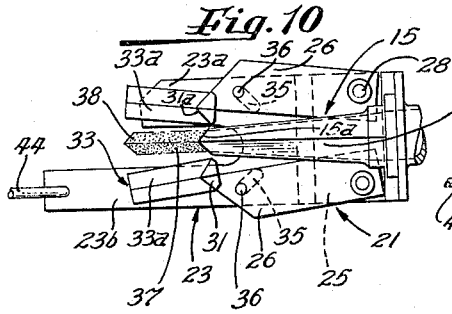
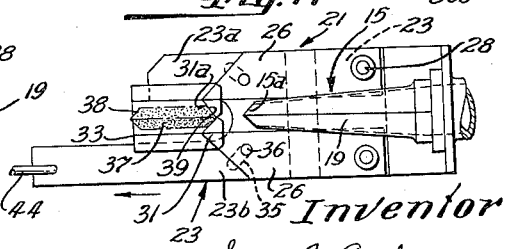
Inventor
Swan F. Anderson
BY McCanna and Morsbach
Attys.

United States Patent Office 2,957,435
Patented Oct. 25, 1960

2,957,435

APPARATUS FOR FORMING FROZEN STICK CONFECTIONS

Swan F. Anderson, 312 N. Highland Ave., Rockford, Ill., assignor of one-half to Ralph F. Anderson, Rockford, Ill.

Filed Oct. 4, 1956, Ser. No. 613,930

19 Claims. (Cl. 107—8)

This invention relates to an improved apparatus for forming frozen stick confections consisting of a bar of frozen confection such as ice cream and a carrying stick handle with one end embedded in the bar.

Frozen stick confections have heretofore been made by cutting bars from a block of confection frozen to a solid state, and inserting stick handles into the bars. The blocks are generally formed by filling a mold after which the block of confection in the mold is chilled for a prolonged period to solidify the confection. The frozen block is removed from the mold by momentarily heating the latter and the block then transferred to a machine which cuts the block into individual bars and inserts sticks into the bars.

Another commonly used arrangement for forming frozen stick confections employs individual molds for the bars. The individual molds are customarily arranged in a gang mold which is filled with the confection in a semi-liquid state, the stick handles being inserted in the semi-liquid confection in the molds and supported in proper position therein by stick holders. The molds are then chilled to solidify the confection and the solid bars having stick handles therein are thereafter removed from the molds.

The aforedescribed arrangements for forming frozen stick confections each require a large and bulky apparatus for chilling the molds to solidify the confection therein and require a large amount of floor space in the processing plant. Moreover, because these arrangements require chilling of the semi-liquid confection after the molds are filled, a large amount of handling is required to transfer the molds from the mold filling machine to the chilling tank and to thereafter transfer the chilled confection to a machine which performs the subsequent forming operations thereon. In practice, several operators are required to effect the various transfers and to cleanse the molds.

An important object of this invention is to provide an improved apparatus for forming frozen stick confections by which these confections can be rapidly formed from the semi-solid confection as it emerges from the continuous type freezer of the ice cream processing apparatus and without requiring the use of molds.

Another object of this invention is to provide apparatus by which the semi-solid confection from a continuous type freezer is formed into bars, stick handles inserted into the bars and the semi-solid confection bars thereafter conveyed by the stick handles thereof through a freezing chamber to solidify the bars.

Another object of this invention is to provide an improved apparatus for forming stick handled confections, which apparatus is compact and does not require a large amount of floor space in the processing plant and in which each of the operations necessary to form the frozen stick confections are effected automatically to minimize the number of operators required.

A more particular object of this invention is to provide an improved apparatus for forming and shaping the bars of semi-solid confection to improve the appearance of the confection bars.

These, together with various ancillary objects and advantages of this invention will be more readily appreciated as the same becomes better understood by reference to the following detailed description when taken in connection with the accompanying drawings wherein:

Figure 1 is a fragmentary top plan view of an apparatus for carrying out the invention;

Fig. 2 is a fragmentary side elevational view of the stick magazine, taken on the plane 2—2 of Fig. 1;

Fig. 3 is a transverse sectional view through the stick magazine, taken on the plane 3—3 of Fig. 2;

Figs. 4 and 5 are fragmentary side elevational views of the apparatus illustrating the parts in different operative positions;

Fig. 6 is an enlarged sectional view of a frozen stick confection formed by the apparatus and prior to the solidification of the confection in the freezing chamber;

Fig. 7 is a fragmentary perspective view of the apparatus for forming stick handled frozen confections with parts broken away to illustrate construction details;

Fig. 8 is an enlarged side elevational view of a stick clamping assembly on the conveyer;

Fig. 9 is a transverse sectional view through the stick clamping assembly taken on the plane 9—9 of Fig. 8; and Figs. 10 and 11 are plan views of the bar forming and shaping apparatus illustrating different operative positions of the same.

The present invention relates to the formation of frozen stick confections formed of ice cream or the like. In general, the apparatus of the present invention is arranged to shape the confection, when in a semi-solid or plastic state, into the form of a bar, insert a stick handle into the formed bar and thereafter convey the semi-solid confection by its stick handle through a freezing chamber to solidify the confection. In accordance with the present invention, the stick handles are chilled before insertion into the bar of semi-solid confection bar sufficient to prevent the semi-solid bar from becoming dislodged from the stick during subsequent handling of the bar by its stick handle. Preferably, the stick handles are chilled to a temperature below the temperature of the confection a temperature below the temperature of the confection so that, when the stick is inserted into the confection, the confection adjacent the handle rapidly solidifies adjacent the handle and provides a bond therebetween which is sufficiently firm to permit subsequent handling of the semi-solid bar by its stick handle.

A semi-solid confection such as ice cream, sherbet or the like is first formed into a ribbon-like web of confection by means of a nozzle indicated generally by the numeral 15. The nozzle is formed with a generally oblong discharge opening 16 at one end thereof and is arranged for connection by means of a fitting 17 at the other end thereof to the apparatus for forming the semi-solid or plastic ice cream or the like (not shown). The confection, as it is fed to the nozzle, is made sufficiently plastic so that it may readily conform to the shape imparted thereto by the nozzle and sufficiently stiff so as to tend to retain this shape. The nozzle may be shaped to impart any desired configuration to the web of confection which is discharged therefrom and, as shown in the drawings, is formed with flat relatively converging side walls 18 and V-shaped top and bottom walls 19.

The ribbon-like web of confection, as it emerges from the nozzle 15, is formed into individual bars by a cutting and forming mechanism designated generally by the numeral 21. The apparatus for forming the plastic confection such as ice cream are generally of the continuous type, and it is therefore necessary in the formation of the bars to sever a bar from the web and move the severed bar away from the advancing web. The bar cutting and forming apparatus 21 of the present invention is mounted on a support block 22 which, as shown in Fig. 7 is disposed below the nozzle 15. A first, generally U-shaped plate 23, is mounted on the block 22 for reciprocation longitudinally of the nozzle and includes opposed leg portions 23a and 23b disposed at opposite sides of the nozzle. A second plate 25 is also mounted on the block for reciprocation longitudinally thereof below the nozzle 15 and arms 26 are pivotally mounted on the second plate by pins 28 for swinging movement in a plane parallel thereto. Upstanding cutter blades 31 are affixed to the free ends of the arms 26 and arranged, upon movement of the arms 26 toward each other, to sever a bar of confection from the web. The blades 31 are formed with forwardly extending projections 33 on the lower ends thereof, which projections are arranged to be moved together to underlie the severed bar when the blades are moved into abutting relationship, and thereby support the severed bar. In order to prevent distortion of the bar out of the shape imparted thereto by the nozzle 15, the extensions 33 are formed with inclined faces 33a shaped to define a V-shaped channel, when the extensions are in abutting relation, corresponding to the V-shaped bottom wall 19 of the nozzle.

The cutter blades 31 are moved together and thereafter drawn longitudinally of the nozzle to sequentially cut a bar from the web of confection and separate the severed bar from the web by means of a cam and pin type arrangement which operatively connects the arms 26 to the plate 23. As best shown in Figs. 10 and 11, the legs 23a and 23b of the plates 23 are formed with relatively converging cam slots 35 and pins 36 are affixed to the arms 26 and extend into the corresponding slot 35. A mechanism, to be described more fully hereinafter, is operatively connected to one of the legs such as 23b of the first plate and arranged to reciprocate the latter. As the plate 23 is drawn forward, it is initially moved away from the plate 25 whereupon the pins 36 are cam actuated by the cam slots 35 to move the cutter blades 31 toward each other in a cutting motion. When the blades 31 are moved into abutting relationship, the arms 26 can no longer move relative thereto, whereupon the arms are drawn along with the plate 23 to thereby move the cutter blades 31 and the extensions 33 thereon in a directional longitudinally of the nozzle 15 to separate the severed bar from the advancing web.

The cutting and forming apparatus 21 is also arranged to shape the severed ends of the bar. As best shown in Figs. 1, 10 and 11, the discharge end 15a of the nozzle is made wedge-shaped, and the cutter blades 31 are arranged to engage the wedge-shaped end of the nozzle to be guided thereby as the cutter blades are moved toward each other in a cutting operation. The leading end of the web of confection is, therefore, formed with a V-shaped end wall such as shown at 38 in Fig. 10. The cutter blades 31 are preferably formed with a triangular cross section arranged to provide relatively converging cutter faces 31a which slope in a direction opposite the wedge-shaped end 15a of the nozzle to thereby shape the trailing edge 39 of the bar as shown in Fig. 11 with a wedge-shaped configuration opposite the leading edge. Moreover, it will be noted that the upstanding V-shaped trough, formed by the cutter blades 31, tends to stabilize and support the severed bar in an upright position.

The plate 23 of the cutting and forming mechanism is reciprocated by means of a lever 41 pivotally mounted by a pin 42 on a support frame 43 and having its free end connected by means of a link 44 to the plate. An arm 45 is affixed to the pin 42, which arm has a follower 46 engageable with a barrel cam 47 which is driven by means of a motor 48 through a gear reduction mechanism 49.

Stick handles 30 are inserted into the severed bars 37 of semi-solid confection and the bars thereafter conveyed by their stick handles to a freezing chamber whereinthe bars are solidified. For this purpose there is provided a conveyer designated generally by the numeral 51 and herein shown comprised of a plurality of stick clamping assemblies 52 which are pivotally interconnected by links 53. As best shown in Figs. 8 and 9, each of the stick clamping assemblies 52 includes a block 54 having a transverse slot 55 formed therein intermediate the ends thereof and a resilient spring clip 56 affixed to the block as by fasteners 57 and overlying the slot 55 therein to yieldably retain a stick handle on the block. The upper end 56a of the clamp is flared slightly to guide the stick handle into the slot and an inwardly depressed nose portion 56b is formed adjacent the lower end of the clamp to resiliently press the stick against the block. Conveniently, the block 54 may be formed of a material such as plastic.

The conveyer 51 is driven by means of a drive sprocket 59 preferably located adjacent the bar cutting and forming apparatus, which drive sprocket supports the chain thereat at a position overlying the web of confection as it emerges from the nozzle 15. The conveyer is entrained over suitable idler sprockets such as 61, and is arranged to pass through a freezing chamber designated generally by the numeral 62 (see Fig. 4), suitable openings 63 being provided to permit the conveyer and the confection carried thereby to pass into and out of the freezing chamber. The drive sprocket 59 is driven to sequentially advance the clamping assemblies 52 thereon into operative position adjacent the bar forming mechanism. As shown in Fig. 7, the drive sprocket 59 is driven by means of a shaft 65 journaled in the frame 66, which shaft is operatively connected by bevel gears 67 to a cross shaft 68 supported in bearings 69. The sprocket 59 is rotated in timed relation with the operation of the bar forming mechanism. This may be conveniently effected by means of a ratchet wheel 71 affixed to the shaft 68 and a pawl 72 mounted on an arm 73 oscillatibly supported on the shaft 68 and cooperable with the ratchet wheel to rotate the shaft 68 and the arm 73 is oscillated. The arm 73 is oscillated in timed relation to the operation of the cutting and forming mechanism by means of a link 74. The link 74 has one end thereof slidably supported on a block 70 and has a follower intermediate its ends engageable with the cam 75 connected to the gear reduction apparatus 49. This conveyer operating mechanism is arranged to move the conveyer from a position in which one of the clamping assemblies 52 is in operative position relative to the cutting and forming mechanism to a position in which the next succeeding clamping assembly is in operative position, in the time interval required for the cutting and forming assembly to go through one complete cycle of operation. A pawl 76 and ratchet wheel 77 is provided for preventing reverse rotation of the shaft 68.

A stick magazine indicated generally by the numeral 78 is mounted to overlie the conveyer and includes a mechanism 79 operative to dispense a stick from the magazine and insert the stick through a stick clamping assembly 52 on the conveyer and into the severed bar of semi-solid confection. The stick magazine 78 is conveniently mounted to extend radially of the drive sprocket 59 and as shown in the drawings is mounted by means of a block 81 on the upper end of the sprocket drive shaft 65. The block 81 is spaced from the sprocket 59 by means of a collar 82 and a retaining collar 83 is secured to the upper end of the drive shaft to retain the latter in position thereon. The stick magazine 78 includes a generally U-shaped trough 84 (see Figs. 2 and 3) which is secured to the end of the block 81 and extends substantially radially of the end of the drive sprocket 59. Brace bars 85 are secured to the outer ends of the magazine and to the support frame 66, as shown in Figs. 1 and 4, to prevent the stick magazine from rotating with the shaft 65. The trough 84 is open at the end thereof adjacent the mounting block 81 and a stick advancing mechanism 86 is provided for moving the sticks toward the open end of the trough. Conveniently, the stick advancing mechanism includes a slide mounted on a rod 87 which extends longitudinally of the trough and having a depending finger 88 arranged to engage the endmost stick in the magazine. A cable 89 is attached to the stick advancing apparatus and entrained over a pulley 91, which cable is otherwise connected to a suitable weight or a spring (not shown) arranged to yieldably urge the stick advancing mechanism toward the open end of the trough.

As previously described, the stick handles are chilled before being inserted into the semi-solid confection sufficiently to prevent the semi-solid confection bar from falling off the stick during the subsequent handling of the bar by its stick handle and preferably the stick handles are chilled to a temperature below that of the confection to thereby solidify the confection adjacent the stick and provide a relatively firm bond therebetween. For this purpose an outer jacket 93 is disposed around the trough 84 and sealed thereto at the top and ends of the trough to define a chamber therebetween. A refrigerant or a cooled liquid such as brine is circulated through this chamber by means of inlet and outlet fittings 94 and 95. Preferably, the inlet and outlet fittings communicate with the chamber adjacent the top thereof and a perforate baffle plate 96 is provided adjacent the bottom of the chamber to assure proper circulation of the cooling liquid around the trough 84.

A guide plate 98, forming part of the stick inserting mechanism, is interposed between the inner end of the trough 84 and the mounting block 81 and is formed with a guideway 99 therein for slidably receiving the stick injector 101. An opening 102 (see Fig. 2) is formed in the lower end of the stick magazine 78 at the end thereof adjacent the guide plate 98 to permit the sticks to be ejected therethrough. The stick injector 101 is reciprocated in timed relation with the operation of the conveyer 51 and the cutting and forming mechanism 21, and is arranged to dispense a stick from the magazine 78 and insert the stick through the stick clamping mechanism 52 therebelow and into the bar of semi-solid confection. For this purpose a rod 104 is mounted for actual sliding movement concentrically of the sprocket drive shaft 65 and has the upper end 105 thereof secured to the stick injector 101. The rod 104 is reciprocated by a lever 106 which is pivotally mounted intermediate its ends by means of a pin 107 on the frame member 43. A follower 108 is provided at one end of the lever 106 and arranged for engagement with the cam member 47 which operates the bar cutting and forming apparatus. A block 109 is adjustably clamped to the lower end of the rod 104 and has a projection thereon received in the bifurcated end 110 of the lever 106 to thereby effect reciprocation of the rod 104 in response to oscillation of the lever 106.

An apparatus is also provided for ejecting the frozen stick confections from the conveyer, after the confections have passed through the freezing tunnel. A guide block 115 is mounted on the main frame 66 and is formed with an opening therein for guidably receiving the conveyer 52. A slide 116 is reciprocably mounted on the block 115 and carries an ejector member 117 arranged to engage the stick handles on the confection bars, as the clamping assemblies pass through the guide block, to eject the stick handles therefrom. The stick ejector is also reciprocated in timed relation to the operation of the conveyer 51 and as shown in Fig. 7 there is provided a lever 118 having one end thereof pivotally mounted on a pin 119 secured to a frame member 120 and the other end thereof extending into an opening 121 in the slide to effect reciprocation of the latter in response to oscillation of the lever. The lever 118 is connected by a link 122 to a lever 123 also pivotally attached to the frame member 120. A link 124 connects the lever 123 to a bell crank 125 mounted on the frame member 43.

The bell crank 125 has a follower 126 thereon engageable with a cam 127 which is operated in timed relation with the conveyer operating cam 175.

In the following brief description of the operation of the device it is assumed that the parts are in the position shown in Fig. 7 with the cutter blades 31 in their retracted position and spaced apart, as shown in Fig. 10, and with the stick dispenser 101 and stick ejector 117 in their raised positions. The ice cream as it is supplied to the nozzle 15 is in a semi-solid or plastic state and is shaped by the nozzle into a ribbon-like web of semi-solid confection. With the nozzle form illustrated in the drawings, the web will have wedge-shaped top and bottom edges. The speed of operation of the apparatus for forming the frozen stick confections is correlated with the rate of flow of the ice cream to the nozzle so that, when the extruded web reaches a predetermined length, the cam 47 is operative through the bell crank 45, lever 41 and link 44 to move the first plate 23 to an extended position. As the plate 23 is moved toward its extended position, the pins 36 on the cutter blade arms 26 ride in the cam slots 35 to thereby urge the cutter blades 31 toward each other in a cutting motion. The cutter blades cam over the wedge-shaped end 15a of the nozzle to thereby shape the leading edge of the web in the form of a wedge. Since the cutter blades 31 are formed with relatively converging faces 31a which slope in a direction opposite the wedge-shaped end 15a of the nozzle, the trailing edge 39 of the bar of ice cream is also reformed into the shape of a wedge. When the cutter blades 31 have moved into engagement with each other, further movement of the first plate 23 toward its extended position effects moval of the cutter blades therewith to thereby advance the severed bar away from the advancing web of confection. The severed bar is supported by the extensions 33 formed on the lower ends of the cutter blades 31, which extensions are also provided with relatively converging faces 33a arranged to retain the shape of the bar imparted thereto by the nozzle 15.

As the severed bar of confection 37 is moved to its extended position, and while it is supported by the extensions 33 on the cutter blades 31, the stick injector 101 is operated from the position illustrated in Fig. 4 to the position illustrated in Fig. 5 to insert a stick into the bar and through the stick clamping assembly 52 on the conveyer 51. In the specific arrangement shown, the stick injector is operated by the same cam 47 used to operate the cutting and forming apparatus, the follower 108 which operates the lever 106 being arranged in the cam groove so as to trail the follower 46 by a preselected amount sufficient to permit movement of the severed bar to its extended position before the injector 101 is operated to insert a stick therein. The stick handles in the magazine 78 are chilled by the coolant to a temperature preferably below the temperature of the semi-solid confection whereby, when the stick handles are inserted into the confection, the confection adjacent the stick handle is solidified as indicated in Fig. 6. This has been found to provide the bond between the stick handle and the semi-solid confection which is sufficient to permit the subsequent handling of the semi-solid confection by its stick handle as it is conveyed to and through the freezing chamber.

After the stick handle has been inserted into the clamp assembly 52 and bar, the conveyer 51 is operated by the cam 75, link 74 and pawl and ratchet assembly 71 and 72 to step the conveyer to its next succeeding position bringing a succeeding clamping assembly into operative position relative to the cutting and forming mechanism. Simultaneously, a preceding stick confection on the conveyer is moved into the freezing chamber 62 and a further preceding stick confection on the conveyer is moved out of the freezing chamber after having been solidified therein.

As the stick clamping assemblies 52 move past the ejector mechanism, the slide 116 is operated in timed relation with the stepped advance of the conveyer, to discharge the frozen stick confection from the conveyer.

The stick confection formed by the apparatus comprises a bar 37 of semi-solid confection having substantially flat side walls and a wedge-shaped edge extending completely therearound. As is apparent, the nozzle 15 and cutting and forming apparatus 21 may be arranged to impart a somewhat different shape to the bar, if desired.

A stick handle 30 extends outwardly from one edge of the bar. As illustrated in Fig. 6, the semi-solid confection adjacent the stick handle is solidified when the chilled handle is inserted into the bar and provides a bond between the handle and bar which permits handling of the semi-solid confection by the stick handle.

I claim:

1. An apparatus for forming frozen confection bars having a stick handle comprising, means for forming a bar of semi-solid confection, a stick magazine, means for chilling the sticks in the magazine, a conveyer having a stick clamping assembly thereon disposed intermediate said stick magazine and said bar forming means, means for dispensing a stick from said magazine and for inserting the stick through said clamping assembly into the bar of semi-solid confection without ejecting the stick from the clamping assembly, a freezing chamber, and means for advancing said conveyer through the freezing chamber to convey the confection bar therethrough supported by its stick handle.

2. An apparatus for forming frozen confection bars having a stick handle comprising, means for forming a bar of semi-solid confection, a stick magazine, means for chilling the sticks in the magazine, a conveyer having a stick clamping assembly thereon disposed intermediate said stick magazine and said bar forming means, means for dispensing a stick from said magazine and for inserting the stick through said clamping assembly into the bar of semi-solid confection without ejecting the stick from the clamping assembly, a freezing chamber, means for advancing said conveyer through the freezing chamber to convey the confection bar therethrough supported by its stick handle, and means operative in timed relation with said conveyer for ejecting the stick from said clamping means after said bar has passed through the chamber.

3. An apparatus for forming frozen confection bars having stick handles comprising, a nozzle having a vertically disposed discharge opening for extruding a ribbon-like web of semi-solid confection, a pair of vertically extending cutter blades disposed along opposite sides of the web of confection, means for moving said cutter blades toward each other to sever a bar from said web and for moving said cutter blades in the direction of flow of said web to separate the severed bar therefrom, a stick magazine, means for inserting a stick from the magazine into a bar severed from said web, a freezing chamber, and means engageable with the stick in the severed bar for conveying the bar by its stick handle through a freezing chamber.

4. The combination of claim 3 including means on said cutter blades arranged to underlie the severed bar when said blades are moved together to thereby support the severed bar.

5. The combination of claim 4 wherein said cutter blades are shaped to form a channel-shaped trough at the side thereof adjacent the severed bar when said blades are moved together to thereby stabilize the severed bar against lateral displacement.

6. An apparatus for forming frozen confection bars comprising a nozzle for extruding a ribbon-like web of semi-solid confection, means for severing a bar from said web comprising a first plate mounted for reciprocation longitudinally of the nozzle, a pair of cutter blades disposed at opposite sides of the web and pivotally mounted on said first plate for movement toward and away from each other to sever a bar from the web, a second plate mounted for reciprocation longitudinally of the nozzle, cam means connecting said second plate to said cutter blades operative upon initial movement of said second plate in one direction to cam operate said cutter blades together and sever a bar from the web and to thereafter draw said cutter blades and said first plate therewith to separate the bar from the web, and means for reciprocating said second plate.

7. The combination of claim 6 including means on said nozzle for guiding said cutter blades as the blades are moved toward each other.

8. An apparatus for forming frozen confection bars comprising a nozzle for extruding a ribbon-like web of semi-solid confection, means for severing a bar from said web comprising a first plate mounted for reciprocation longitudinally of the nozzle, a pair of cutter blades disposed at opposite sides of the web and pivotally mounted for movement toward and away from each other to sever a bar from the web, a second plate mounted for reciprocation longitudinally of the nozzle, cam means connecting said second plate to said cutter blades operative upon initial movement of said second plate in one direction to cam operate said cutter blades together and sever a bar from the web and to thereafter draw said cutter blades and said first plate therewith to separate the bar from the web, means for reciprocating said second plate, and means operative in timed relation to the reciprocation of said second plate for inserting a stick handle into the severed bar.

9. An apparatus for forming frozen confection bars comprising a nozzle for extruding a ribbon-like web of semi-solid confection, means for severing a bar from said web comprising a first plate mounted for reciprocation longitudinally of the nozzle, a pair of cutter blades disposed at opposite sides of the web and pivotally mounted for movement toward and away from each other to sever a bar from the web, a second plate mounted for reciprocation longitudinally of the nozzle, cam means connecting said second plate to said cutter blades operative upon initial movement of said second plate in one direction to cam operate said cutter blades together and sever a bar from the web and to thereafter draw said cutter blades and said first plate therewith to separate the bar from the web, means for reciprocating said second plate, a stick magazine, means for chilling the sticks in the magazine to a temperature below the temperature of said semi-solid confection, means operative in timed relation to said bar severing means for inserting a stick into the severed bar, a freezing chamber, and means engageable with the stick in the severed bar for conveying the severed bar by its stick handle through a freezing chamber.

10. An apparatus for forming frozen confection bars comprising a nozzle for extruding a ribbon-like web of semi-solid confection, means for severing a bar from said web comprising a first plate mounted for reciprocation longitudinally of the nozzle, a pair of cutter blades disposed at opposite sides of the web and pivotally mounted for movement toward and away from each other to sever a bar from the web, a second plate mounted for reciprocation longitudinally of the nozzle, cam means connecting said second plate to said cutter blades operative upon initial movement of said second plate in one direction to cam operate said cutter blades together and sever a bar from the web and to thereafter draw said cutter blades and said first plate therewith to separate the bar from the web, means for reciprocating said second plate, a stick magazine, a conveyer disposed between said magazine and said nozzle and having a plurality of stick clamping assemblies thereon, means operative in timed relation with said bar severing means for inserting a stick into one of said clamping assemblies on the conveyer and into a severed bar, a freezing chamber, and means for advancing said conveyer through said freezing chamber to carry the severed bars by their stick handles therethrough and solidify the bars.

11. An apparatus for forming frozen confection bars having stick handles comprising a conveyer having a plurality of stick clamping assemblies thereon, a stick magazine overlying said conveyer, a magazine mounting bracket attached to said magazine, a sprocket meshing with said conveyer, a shaft rotatably received in said bracket operatively connected to said sprocket to support the sprocket, means located below said sprocket for forming a bar of confection, means on said bracket for inserting a stick from said magazine into a stick clamping assembly on the conveyer and into a bar of confection, and means for operating said conveyer, said bar forming means and said stick inserting means in timed relation.

12. The combination of claim 11 wherein said stick inserting means includes an operating rod slidably extending through said shaft for reciprocation relative thereto.

13. In an apparatus for forming confections, means for inserting stick handles into the confection comprising a generally U-shaped stick magazine, means defining a coolant chamber at the sides of said magazine, means for circulating a coolant through said chamber to chill the sticks in said magazine, and means for inserting a stick from said magazine directly into the confection.

14. An apparatus for forming frozen confection bars having stick handles comprising bar forming means for forming a bar of semi-solid confection, a freezing chamber, an endless conveyor extending past said bar forming means and through said freezing chamber, said endless conveyor having a plurality of stick clamping assemblies at longitudinally spaced points thereon, a stick magazine, means operative in timed relation with said bar forming means for inserting a stick from the magazine through one of the clamping assemblies on the conveyor and into a bar of confection and means for advancing said conveyor to convey the severed bar by its stick handle to and through the freezing chamber.

15. An apparatus for forming frozen confection bars having stick handles comprising, a nozzle for continuously extending a ribbon like web of semi-solid confection, bar forming means for severing a bar of confection from said ribbon, a freezing chamber, an endless conveyor extending adjacent said bar forming means and through said freezing chamber, said endless conveyor having a plurality of stick clamping assemblies mounted at longitudinally spaced points therealong, a stick magazine, means operative in timed relation to said bar forming means for inserting a stick from the magazine through one of the clamping assemblies on the conveyor and into a bar of confection and means for advancing said conveyor to convey the severed bar by its stick handle to and through the freezing chamber.

16. The combination of claim 15 wherein said bar severing means inclures spaced cutter blades disposed along opposite sides of the web of confection, and means for moving said cutter blades toward each other to sever a bar from the web of confection and for moving the cutter blades in the direction of flow of said web to advance the severed bar away from the web.

17. An apparatus for forming frozen confection bars having stick handles comprising, a nozzle for continuously extruding a ribbon-like web of semi-solid confection, cutter means positioned alongside the extruded web of confection, intermittently operated means for moving the cutter means cross-wise of the web to sever a bar therefrom and for moving the cutter means in the direction of movement of the web to advance the severed bar away from the web, means movable with said cutter means for supporting the severed bar during movement by the cutter means, means operated in timed relation with said severing means for inserting a stick handle into the severed bar while it is supported on said supporting means, a freezing chamber, and means engageable with the stick in the severed bar for conveying the bar by its handle through the freezing chamber.

18. An apparatus for forming frozen confection bars having stick handles comprising, a nozzle for continuously extruding a ribbon-like web of semi-solid confection, cutter means positioned alongside the extruded web of confection, intermittently operated means for moving the cutter means cross-wise of the web to sever a bar therefrom and for moving the cutter means in the direction of movement of the web to advance the severed bar away from the web, means movable with said cutter means for supporting the severed bar during movement by the cutter means, an endless conveyer having a plurality of stick clamping assemblies thereon and having a portion extending alongside the severed bar on said supporting means, a stick magazine positioned adjacent the severed bar on said supporting means, means operative in timed relation with said bar severing means for inserting a stick from the magazine into the severed bar while it is supported on said supporting means, a freezing chamber, and means for intermittently advancing said conveyer in timed relation with said stick inserting means to convey the severed bars by their stick handles through the freezing chamber.

19. An apparatus for forming frozen confection bars having a stick handle comprising, a nozzle for continuously extruding a ribbon-like web of confection, means for severing a bar from the web, means for inserting stick handles into the confection bar comprising a generally U-shaped stick magazine, means defining a coolant chamber at the sides of said magazine, means for circulating a coolant through the chamber to chill the sticks in the magazine, and means for inserting a stick from the magazine directly into the confection bar.

References Cited in the file of this patent

UNITED STATES PATENTS

| | | |
|---|---|---|
| 1,384,310 | Dungan | July 12, 1921 |
| 1,520,302 | Morgan | Dec. 23, 1924 |
| 1,593,858 | Venable | July 27, 1926 |
| 1,737,919 | Crain | Dec. 3, 1929 |
| 1,919,692 | Falkendorf | July 25, 1933 |
| 2,094,769 | Anderson | Oct. 5, 1937 |
| 2,101,570 | Bolen | Dec. 7, 1937 |
| 2,154,695 | Phelps et al. | Apr. 18, 1939 |
| 2,505,243 | Hewitt et al. | Apr. 25, 1950 |
| 2,613,618 | Sharp et al. | Oct. 14, 1952 |
| 2,629,346 | Johansen | Feb. 24, 1953 |
| 2,640,033 | Marshall | May 26, 1953 |
| 2,739,545 | Nelson | Mar. 27, 1956 |
| 2,859,714 | Cummings et al. | Nov. 11, 1958 |